US009860084B2

(12) United States Patent
Houghton et al.

(10) Patent No.: US 9,860,084 B2
(45) Date of Patent: Jan. 2, 2018

(54) TECHNIQUES FOR MANAGING SOUNDING INTERVALS OF A WIRELESS COMMUNICATIONS DEVICE

(71) Applicant: QUALCOMM Incorporated, San Diego, CA (US)

(72) Inventors: Nathaniel Houghton, San Jose, CA (US); Xiaolong Huang, Morgan Hill, CA (US); Guido Robert Frederiks, Watsonville, CA (US); Qinghai Gao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 14/812,977

(22) Filed: Jul. 29, 2015

(65) Prior Publication Data
US 2017/0033950 A1 Feb. 2, 2017

(51) Int. Cl.
*H04L 12/40* (2006.01)
*H04L 25/02* (2006.01)
(Continued)

(52) U.S. Cl.
CPC ........ *H04L 25/0224* (2013.01); *H04L 1/0027* (2013.01); *H04W 24/02* (2013.01); *H04L 5/00* (2013.01)

(58) Field of Classification Search
CPC .......................................................... H04L 5/00
See application file for complete search history.

(56) References Cited

U.S. PATENT DOCUMENTS 7,848,252 B2 * 12/2010 Choi ..................... H04L 1/0003
370/252
2008/0013505 A1 * 1/2008 Trainin ................. H04L 1/0004
370/338
(Continued)

FOREIGN PATENT DOCUMENTS

WO WO-2011/035204 A2 3/2011
WO WO-2014/042892 A1 3/2014

OTHER PUBLICATIONS

Allman V Paxson ICSI E Blanton Purdue University M: "TCP Congestion Control; rfc5681.txt", TCP Congestion Control; RFC5681.TXT, Internet Engineering Task Force, IETF; Standard, Internet Society (ISOC) 4, Rue Des Falaises Ch—1205 Geneva, Switzerland, Sep. 1, 2009 (Sep. 1, 2009), XP015065673, [retrieved on Sep. 5, 2009] pp. 6-8.
(Continued)

*Primary Examiner* — Ricky Ngo
*Assistant Examiner* — DeWanda Samuel
(74) *Attorney, Agent, or Firm* — Arent Fox, LLP

(57) ABSTRACT

Various aspects are provided for managing a sounding interval of a wireless communications device, which may include setting a timing of one or more channel sounding operations performed by the communications device. For instance, a method is provided for channel sounding management. This example method may include obtaining information regarding a modulation and coding scheme (MCS) or a throughput degradation gradient associated with one or more transmissions. In addition, the example method may include determining a timing of one or more sounding operations based on the information regarding the MCS or the throughput degradation gradient. Additionally, apparatuses and computer-readable media are provided for channel sounding management in a communications device, which
(Continued)

are configured to perform, or store computer-executable code to perform, the disclosed example methods.

30 Claims, 9 Drawing Sheets

(51) Int. Cl.
*H04W 24/02* (2009.01)
*H04L 1/00* (2006.01)
*H04L 5/00* (2006.01)

(56) References Cited

U.S. PATENT DOCUMENTS

| | | | |
|---|---|---|---|
| 2009/0046800 A1* | 2/2009 | Xu | H04B 7/0617 375/267 |
| 2010/0061438 A1* | 3/2010 | Tan | H04L 1/0003 375/227 |
| 2013/0188630 A1* | 7/2013 | Song | H04W 84/12 370/338 |
| 2015/0117325 A1 | 4/2015 | Ponnuswamy | |
| 2015/0237513 A1* | 8/2015 | Garrett | H04L 25/0224 370/252 |
| 2016/0036572 A1* | 2/2016 | Bhanage | H04L 5/0048 370/329 |

OTHER PUBLICATIONS

International Search Report and Written Opinion—PCT/US2016/040141—ISA/EPO—dated Nov. 3, 2016. 16 Total Pages.

\* cited by examiner

TECHNIQUES FOR MANAGING SOUNDING INTERVALS OF A WIRELESS COMMUNICATIONS DEVICE

BACKGROUND

Field of the Disclosure

The present disclosure relates generally to telecommunications, and specifically to techniques for managing sounding intervals for wireless communications device transmissions.

Description of Related Art

When communicating over a wireless communication channel, devices may intermittently pause transmission of packet data to determine radio conditions of the channel. This process of determining the radio conditions of a wireless communication or channel may be referred to as "sounding," and the interval upon which instances of sounding are conducted may be referred to as a "sounding interval." Techniques exist that attempt to set the sounding interval to effect an optimal resulting throughput associated with a channel. For instance, some existing techniques utilize prior sounding results or data error rate feedback to adjust a sounding interval. These techniques, however, may be computationally complex and may produce unreliable results, for example, due to traffic arrival irregularity in the channel.

Therefore, techniques for improved sounding interval management are needed.

SUMMARY

The present disclosure presents example methods and apparatuses for improved sounding interval selection in wireless communications systems. For instance, the present disclosure presents an example apparatus for channel sounding management. In an aspect, the example apparatus may include a processor and a memory coupled to the processor, where the memory stores instructions executable by the processor to obtain information regarding a modulation and coding scheme (MCS) or a throughput degradation gradient associated with one or more transmissions, and determine a timing of one or more sounding operations based on the information regarding the MCS or the throughput degradation gradient.

Additionally, the present disclosure describes an example method for channel sounding management, which may include obtaining information regarding an MCS or a throughput degradation gradient associated with one or more transmissions, and determining a timing of one or more sounding operations based on the information regarding the MCS or the throughput degradation gradient.

In addition, the present disclosure presents an example apparatus for channel sounding management, which may include an information obtaining component configured to obtain information regarding an MCS or a throughput degradation gradient associated with one or more transmissions, and a sounding interval timing component configured to determine a timing of one or more sounding operations based on the information regarding the MCS or the throughput degradation gradient.

Moreover, the present disclosure presents an example non-transitory computer-readable medium storing computer-executable instructions, the computer-readable instructions including code for obtaining information regarding an MCS or a throughput degradation gradient associated with one or more transmissions and code for determining a timing of one or more sounding operations based on the information regarding the MCS or the throughput degradation gradient.

Furthermore, the present disclosure presents an example apparatus for channel sounding management, which may include means for obtaining information regarding an MCS or a throughput degradation gradient associated with one or more transmissions, and means for determining a timing of one or more sounding operations based on the information regarding the MCS or the throughput degradation gradient.

As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
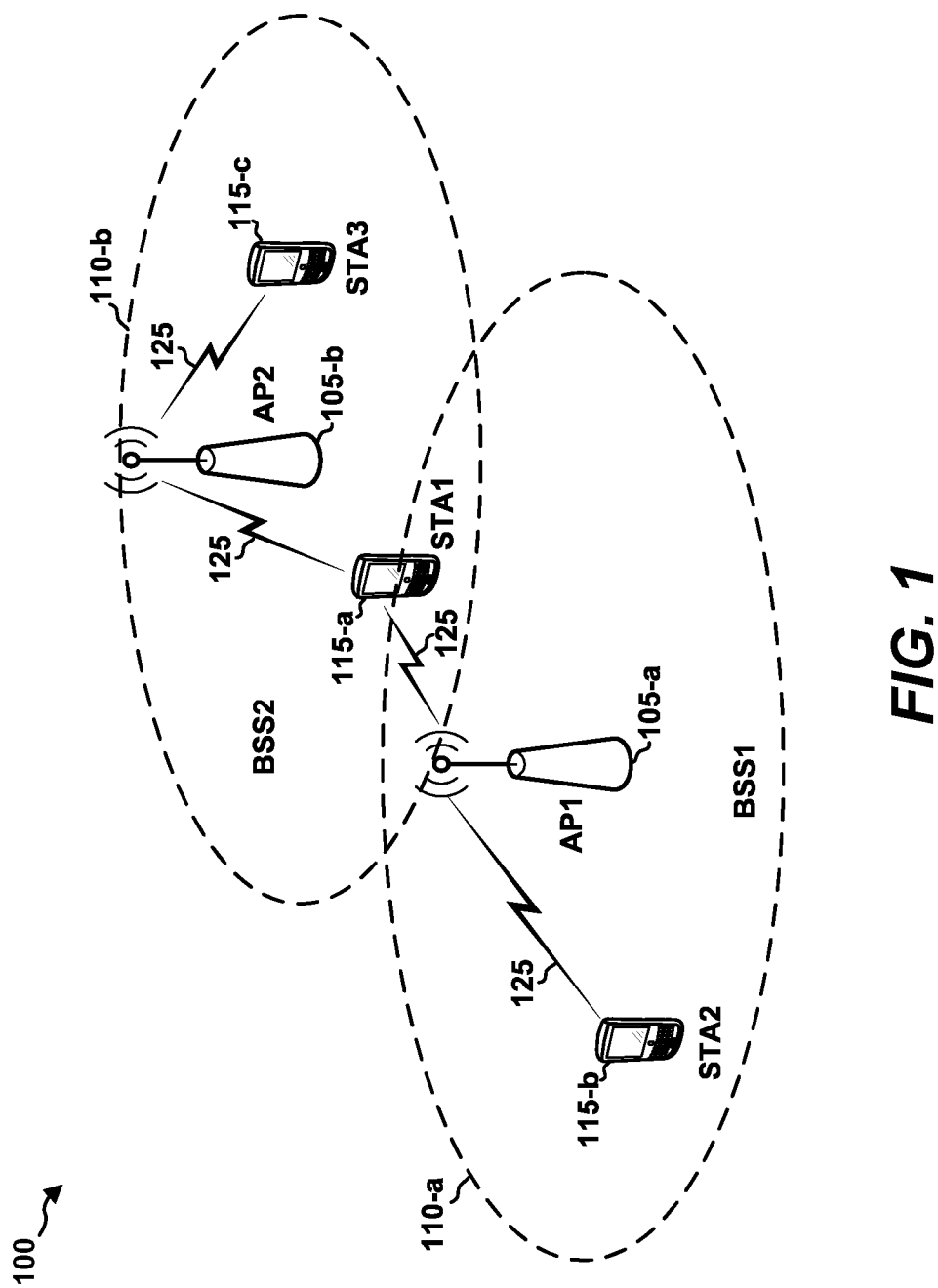
FIG. 1 is a conceptual diagram illustrating an example of a wireless local area network (WLAN) deployment.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details.

The present disclosure provides various aspects for improving sounding interval management in devices communicating over a wireless channel in a wireless communications network. In an aspect, methods and apparatuses are presented for pausing the transmission of any further data bursts and performing a sounding operation based on information associated with one or more current transmission bursts, prior transmission bursts, or both. In some examples, such information may be an MCS index associated with a current and prior transmission burst. In such examples, a reactive sounding method presented by the present disclosure may include comparing a current MCS index (e.g., the MCS index of a most recent transmission burst) and a prior MCS index (e.g., the MCS index of an initial transmission burst following a most recent sounding operation) to determine an MCS index drop value that corresponds to a number of MCS indices that the MCS index for transmissions has dropped since the most recent sounding operation. In such an example, a communications device may pause any further transmission bursts and perform a sounding operation where it is determined that the MCS index drop value exceeds a predetermined threshold MCS index drop value.

In another example, the information associated with the one or more transmission bursts may include collecting MCS index drop values, which may include historical and/or instantaneous MCS index drop values, for a single transmission burst (e.g., four Packet Data Units (PDUs) or any other number of PDUs, such as one, two, three, five, or ten PDUs, for example). In these examples, a communications device may collect the MCS index drop values and may determine the timing of one or more subsequent sounding operations (i.e., a sounding interval) based on the MCS index drop values.

In a further example, the information associated with the one or more transmission bursts may include determining a throughput degradation gradient associated with one or more transmission bursts since a preceding sounding operation. This throughput degradation gradient may represent a rate at which a throughput worsens (e.g., decreases) or improves (e.g., increases) over a certain time period, which in some cases may correspond the time interval since the preceding sounding operation. Furthermore, for purposes of the present disclosure, the term "throughput" may refer to any metric for channel data communication volume or quality, such as, but not limited to: goodput; data, packets, or PDUs transmitted during a period of time; bit error rate; percentage error rate; or any other metric known in the art. In an additional aspect, the determined throughput degradation gradient may correspond to a ratio of: (1) a throughput change percentage between a first throughput associated with the first PDU and a second throughput associated with the last PDU, to (2) an elapsed time between transmission of the first PDU and transmission of the last PDU.

Once the throughput degradation gradient is determined, the communications device may compute an expected sounding interval for subsequent transmission bursts based on the throughput degradation gradient. In addition, the communications device may compare the expected sounding interval to a current (i.e., most recently implemented) sounding interval and setting a subsequent sounding interval based on the comparison.

By utilizing one or more of the methods presented by the present disclosure, a communications device may dynamically apply information associated with current or previous channel conditions to approach an optimal sounding interval for transmissions over the channel.

FIG. 1 is a conceptual diagram 100 illustrating an example of a wireless local area network (WLAN) deployment in connection with various techniques described herein for managing a wireless communications device sounding interval defining the timing of one or more sounding operations performed by the wireless communications device. The WLAN may include one or more access points (APs) and one or more mobile stations (STAs) associated with a respective AP. In this example, there are two APs deployed: AP1 105-$a$ in basic service set 1 (BSS1) and AP2 105-$b$ in BSS2. AP1 105-$a$ is shown having at least two associated STAs (STA1 115-$a$ and STA2 115-$b$) and coverage area 110-$a$, while AP2 105-$b$ is shown having at least two associated STAs (STA1 115-$a$ and STA3 115-$c$) and coverage area 110-$b$. In the example of FIG. 1, the coverage area of AP1 105-$a$ overlaps part of the coverage area of AP2 105-$b$ such that STA1 115-$a$ is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein are based on the example WLAN deployment of FIG. 1 but need not be so limited.

The APs (e.g., AP1 105-$a$ and AP2 105-$b$) shown in FIG. 1 are generally fixed terminals that provide backhaul services to STAs within its coverage area or region. In some applications, however, the AP may be a mobile or non-fixed terminal. The STAs (e.g., STA1 115-$a$, STA2 115-$b$ and STA3 115-$c$) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-$a$, STA2 115-$b$, and STA3 115-$c$ may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-$a$ and AP2 105-$b$ can include software applications and/or circuitry to enable associated STAs to connect to a network via communications links 125. The APs can send frames to their respective STAs and receive frames from their respective STAs to communicate data and/or control information (e.g., signaling). In an aspect, these frames may include data transmitted in one or more protocol data units (PDUs). In some instances, the PDUs may be communicated between the APs and their respective STAs according to a Physical Layer Convergence Protocol (PLCP), which is a wireless communication protocol defined by Institute of Electrical and Electronics Engineers (IEEE), for example, in IEEE 802.6.

Each of AP1 105-a and AP2 105-b can establish a communications link 125 with an STA that is within the coverage area of the AP. Communications links 125 can comprise communications channels that can enable both uplink and downlink communications. When connecting to an AP, an STA can first authenticate itself with the AP and then associate itself with the AP. Once associated, a communications link 125 can be established between the AP and the STA such that the AP and the associated STA can exchange frames, PDUs, and/or messages through a direct communications channel.

While aspects for sounding interval management are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for sounding interval management may be applicable to any suitable wireless network regardless of the coverage range and the wireless access protocols utilized.

Figure 2:
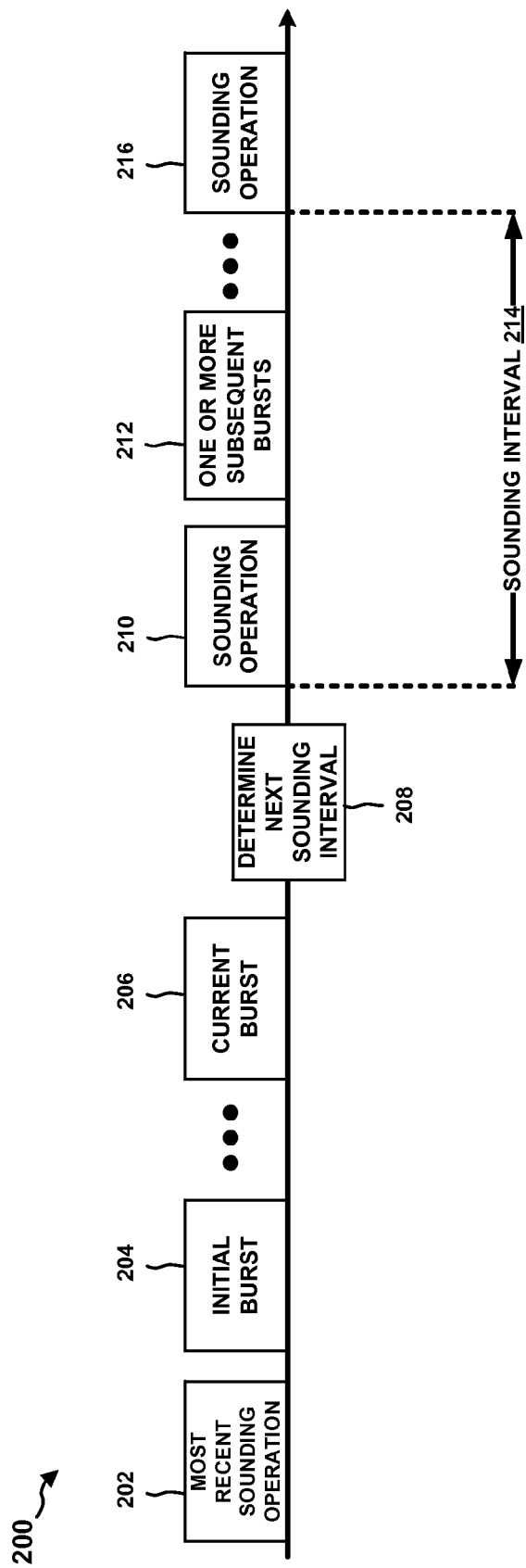
FIG. 2 is a conceptual timing diagram illustrating an example of a transmission schedule of a wireless communications device implementing one or more sounding operations.

FIG. 2 shows a diagram illustrating an example of a transmission schedule 200 comprising a plurality of transmission bursts and intermittent sounding operations performed over a communications channel. In an aspect of the present disclosure, a "transmission burst" may include one or more transmissions of data, such as payload data, control data, pilot data, or any other type of data or packet containing data. Furthermore, for purposes of the present disclosure, the term "transmission" may include one or more transmission bursts. The transmission schedule 200 may be associated with one or more transmissions from an AP (e.g., AP 105 of FIG. 1) or one or more transmissions from an STA (e.g., STA 115 of FIG. 1), any of which may correspond to a communications device of the present disclosure.

In the transmission schedule 200 of FIG. 2, a communications device may perform an initial sounding operation 202 whereby the communications device may transmit one or more test transmissions, for example, over a frequency corresponding to the communications channel and may obtain feedback regarding conditions of the communications channel. Such feedback information may include, but is not limited to, a level of interference, signal strength, or other characteristic data associated with the communications channel. Furthermore, the sounding operation 202 may be performed according to a prior sounding interval that had been established prior to the sounding operation 202.

After completion of the initial sounding operation 202, the communications device may transmit an initial burst 204 following the initial sounding operation 202. After the initial burst 204, one or more further bursts may be transmitted, including a current burst 206. In a particular example where a single transmission burst is transmitted after the initial sounding operation 202, the initial burst 204 may be the current burst 206. However, where more than one burst is transmitted after the initial sounding operation 202, the initial burst 204 may be a separate burst from the current burst 206 with zero or more additional bursts between the initial burst 204 and the current burst 206.

Upon transmission of the current burst 206, the transmission device may be configured to determine a next sounding interval 214 at block 208 based on information associated with one or more transmission bursts, which may include, but are not limited to, the initial burst 204, the current burst 206, or any bursts transmitted therebetween. The next sounding interval 214 determined at block 208 may include a period of time between sounding operations following current burst 206 (e.g., a time between sounding operation 210 and sounding operation 216). In addition, the information according to which that next sounding interval 214 is based may include one or more of a current MCS index associated with current burst 206, an MCS index associated with initial burst 204, or a throughput degradation gradient associated with the initial burst 204, the current burst 206, or any burst transmitted therebetween.

In addition, once the communications device has determined the next sounding interval at block 208, the communications device may transmit one or more subsequent bursts 212 and perform one or more subsequent sounding operations (e.g., sounding operations 210 and 216) according to the determined sounding interval 214. In other words, upon the determination of sounding interval 214 at block 208, the communications device may perform one or more subsequent sounding operations according to sounding interval 214 and may transmit one or more subsequent bursts 212 of PDU transmissions between these subsequent sounding operations.

Figure 3:
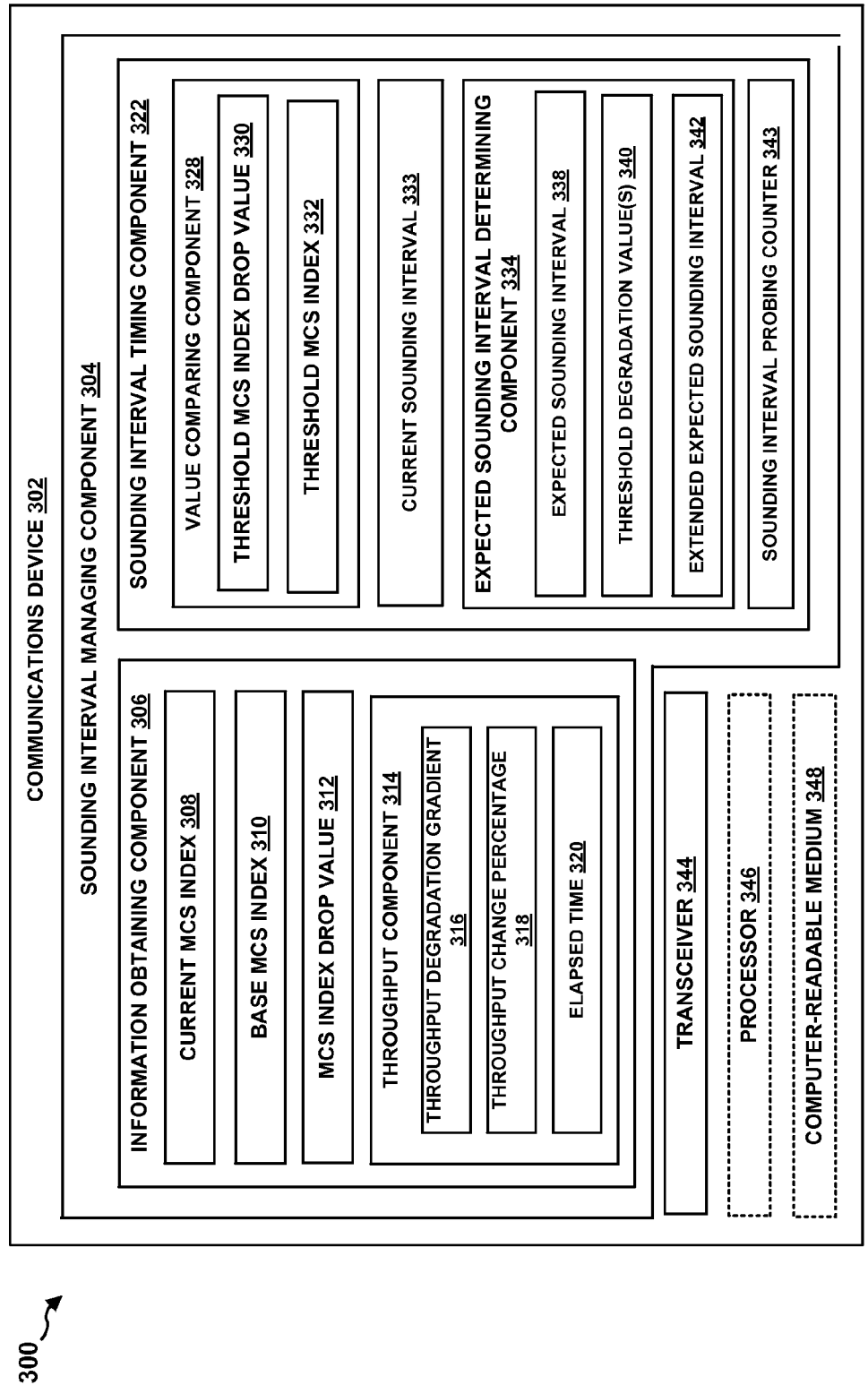
FIG. 3 is a block diagram illustrating an example of a communications device containing a sounding interval managing component.

FIG. 3 shows a block diagram 300 illustrating an example of a communications device 302 of the present disclosure. The communications device 302 may correspond to one or more of the APs 105 or STAs 115 described in FIG. 1 of this disclosure. In an aspect, the communications device 302 may include a sounding interval managing component 304, a transceiver 344, a processor 346, and a computer-readable medium 348. Sounding interval managing component 304 may exist as a stand-alone component comprised of hardware, software, or a combination of hardware and software and may be communicatively coupled to processor 346 and/or computer-readable medium 348. For example, the sounding interval managing component 304, or sub-components thereof, may be implemented as one or more application specific integrated circuits (ASICs). In some examples, the computer-readable medium 348 may store processor- or computer-executable code for performing the algorithms and methods described herein (e.g., the algorithms and methods 400, 500, 600, 700, and 800 described below in FIGS. 4-8, respectively). Additionally or alternatively, the processor 346 may be configured to perform functions associated with sounding interval managing component 304 by executing the processor- or computer-executable functions stored on and obtained from sounding interval managing component 304 and/or computer-readable medium 348.

Furthermore, communications device 302 may also include a transceiver 344 that is communicatively coupled to sounding interval managing component 304 and configured to transmit and receive information (e.g., data, control information) from one or more other communications devices (e.g., one or more APs 105 or STAs 115 described in FIG. 1 of this disclosure). The transceiver 344 may include, or be communicatively coupled with, an antenna to convert electrical power into radio waves for outgoing transmissions, and convert radio waves into electrical power for receiving incoming transmissions. In some examples, the transceiver 344 may include a receiver, transmitter, and hardware, circuitry, and/or instructions for receiving or transmitting information as disclosed throughout the present disclosure.

presented in Table 1 below, where the MCS index column corresponds to an MCS index value of the present disclosure (alternative MCS listings may also be used in place of Table 1 below):

TABLE 1

MCS Index Value Table

| | | | | Data rate (Mbit/s) | | | |
| | | | | 20 MHz channel | | 40 MHz channel | |
| MCS index | Spatial streams | Modulation type | Coding rate | 800 ns GI | 400 ns GI | 800 ns GI | 400 ns GI |
| --- | --- | --- | --- | --- | --- | --- | --- |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16-QAM | 1/2 | 26.00 | 28.90 | 54.00 | 60.00 |
| 4 | 1 | 16-QAM | 3/4 | 39.00 | 43.30 | 81.00 | 90.00 |
| 5 | 1 | 64-QAM | 2/3 | 52.00 | 57.80 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.20 | 135.00 | 150.00 |
| 8 | 2 | BPSK | 1/2 | 13.00 | 14.40 | 27.00 | 30.00 |
| 9 | 2 | QPSK | 1/2 | 26.00 | 28.90 | 54.00 | 60.00 |
| 10 | 2 | QPSK | 3/4 | 39.00 | 43.30 | 81.00 | 90.00 |
| 11 | 2 | 16-QAM | 1/2 | 52.00 | 57.80 | 108.00 | 120.00 |
| 12 | 2 | 16-QAM | 3/4 | 78.00 | 86.70 | 162.00 | 180.00 |
| 13 | 2 | 64-QAM | 2/3 | 104.00 | 115.60 | 216.00 | 240.00 |
| 14 | 2 | 64-QAM | 3/4 | 117.00 | 130.00 | 243.00 | 270.00 |
| 15 | 2 | 64-QAM | 5/6 | 130.00 | 144.40 | 270.00 | 300.00 |
| 16 | 3 | BPSK | 1/2 | 19.50 | 21.70 | 4.50 | 45.00 |
| 17 | 3 | QPSK | 1/2 | 39.00 | 43.30 | 81.00 | 90.00 |
| 18 | 3 | QPSK | 3/4 | 58.50 | 65.00 | 121.50 | 135.00 |
| 19 | 3 | 16-QAM | 1/2 | 78.00 | 86.70 | 162.00 | 180.00 |
| 20 | 3 | 16-QAM | 3/4 | 117.00 | 130.00 | 243.00 | 270.00 |
| 21 | 3 | 64-QAM | 2/3 | 156.00 | 173.30 | 324.00 | 360.00 |
| 22 | 3 | 64-QAM | 3/4 | 175.50 | 195.00 | 364.50 | 405.00 |
| 23 | 3 | 64-QAM | 5/6 | 195.00 | 216.70 | 405.00 | 450.00 |
| 24 | 4 | BPSK | 1/2 | 26.00 | 28.80 | 54.00 | 60.00 |
| 25 | 4 | QPSK | 1/2 | 52.00 | 57.60 | 108.00 | 120.00 |
| 26 | 4 | QPSK | 3/4 | 78.00 | 86.80 | 162.00 | 180.00 |
| 27 | 4 | 16-QAM | 1/2 | 104.00 | 115.60 | 216.00 | 240.00 |
| 28 | 4 | 16-QAM | 3/4 | 156.00 | 173.20 | 324.00 | 360.00 |
| 29 | 4 | 64-QAM | 2/3 | 208.00 | 231.20 | 432.00 | 480.00 |
| 30 | 4 | 64-QAM | 3/4 | 234.00 | 260.00 | 486.00 | 540.00 |
| 31 | 4 | 64-QAM | 5/6 | 260.00 | 288.80 | 540.00 | 600.00 |

The sounding interval managing component 304 may include one or more components configured to manage a sounding interval associated with communications device 302. For example, sounding interval managing component 304 may be configured to determine a timing of one or more sounding operations for communications device 302 based on information associated with one or more transmission bursts.

In an aspect, sounding interval managing component 304 may include an information obtaining component 306, which may be configured to obtain information associated with one or more transmission bursts. For instance, in some aspects, the information obtained by information obtaining component 306 may include a current MCS index 308 associated with a current burst. For purposes of the present disclosure, the current burst may include a most recently transmitted burst, a burst that is being transmitted, a burst awaiting transmission in a transmission queue, or a burst undergoing pre-transmission processing (i.e., compression, packet assembly, caching, etc.).

In addition, any MCS index disclosed in the present disclosure may refer to a particular combination of a number of spatial streams, a modulation type, and a coding rate associated with the transmission of a burst over a communication channel. One example set of combinations are The information contained in Table 1 may be stored, for example, in information obtaining component 306 and/or computer-readable medium 348 of communications device 302. Furthermore, the MCS index values of the present disclosure that may be associated with those listed in Table 1 may include current MCS index 308, base MCS index 310, and/or threshold MCS index 332.

In addition, information obtaining component 306 may be configured to compare the current MCS index 308 to a base MCS index 310. The base MCS index 310 may correspond to the MCS index value used for an initial transmission burst following a most recent channel sounding operation. For instance, in reference to transmission schedule 200 of FIG. 2, where the information obtaining component 306 is obtaining information at or about the time of current burst 206, the initial burst transmitted according to the base MCS index 310 may correspond to initial burst 204. In an aspect, information obtaining component 306 may determine that the current MCS index 308 is less than or equal to the base MCS index 310. In such cases, the information obtaining component may determine an MCS index drop value 312, which is equal to the integer value of the difference between the current MCS index 308 and the base MCS index 310. In other words, where the MCS index drop value 312 is determined to be a positive integer x, the current MCS index 308 is less than the base MCS index 310 by x number of MCS indices. Furthermore, if the MCS index drop value 312 is determined to be zero, then the current MCS index 308 is equal to the base MCS index 310, which reveals that the MCS value has not changed.

Moreover, in some examples, MCS index drop value 312 may correspond to an MCS index drop occurring during a particular transmission burst (e.g., a last-occurring transmission burst). In other words, the MCS index drop value 312 may correspond to a difference in an MCS index between an MCS index of a first PDU transmitted during a particular transmission burst and an MCS index of a last PDU transmitted during the transmission burst. Alternatively, the MCS index drop value 312 may correspond to a statistical MCS index drop based on MCS index drops occurring during a plurality of PDU transmissions of a particular transmission burst. In some examples, this statistical MCS index drop may be an average or mean MCS index drop observed across successive PDUs in the particular transmission burst. In other words, in a non-limiting example of a burst that includes four PDU transmissions, the statistic MCS drop (and therefore the MCS index drop value 312) may correspond to an average of the three MCS index drops between the individual PDU transmissions. For example, where the first PDU is transmitted with an MCS index of 8, the second PDU is transmitted with an MCS index of 7, the third PDU is transmitted with an MCS index of 5, and the fourth PDU is transmitted with an MCS index of 5, the three differences may be 1 (8 minus 7), 2 (7 minus 5), and zero (5 minus 5). As such, where the MCS index drop value 312 is obtained as an average of the inter-burst PDU MCS index drops in such an example, the MCS index drop value 312 is $$\frac{2+1+0}{3}=1.$$

In addition, though the MCS index drop value 312 may correspond to an MCS index drop across a particular set of PDUs in a transmission burst, the MCS index drop value 312 may alternatively correspond to a MCS value associated with a most recently transmitted PDU of a most recently transmitted burst. In other words, in the above example, the MCS index drop value 312 may be zero.

In addition, information obtaining component 306 may include a throughput component 314, which may be configured to determine a throughput degradation gradient associated with one or more transmission bursts (e.g., one or more previous bursts and/or a current transmission burst). In an aspect, the throughput component 314 may be configured to determine the throughput degradation gradient 316 by computing a ratio of a throughput change percentage 318 to an elapsed time 320 and setting the throughput degradation gradient 316 to the ratio. For purposes of the present disclosure, the throughput change percentage 318 may correspond to a percentage difference between a first throughput associated with a first PDU transmitted after a most recent sounding interval and a second throughput associated with the last PDU of the most recent sounding interval. Referring again to FIG. 2, in some examples, this first PDU may correspond to a first PDU of initial burst 204 and the last PDU may correspond to the last PDU contained in current burst 206 (or, in some instances, a last PDU of a burst preceding current burst 206).

In addition, the elapsed time 320 may correspond to a time period between transmission of the first PDU transmitted after a most recent sounding interval and transmission of the last PDU of the most recent sounding interval. Referring to FIG. 2, in some examples, this elapsed time may correspond to a difference in time between transmission of a first PDU of initial burst 204 and transmission of the last PDU contained in current burst 206 (or, in some instance, that of the last PDU of a burst preceding current burst 206).

Furthermore, for any given elapsed time 320 (which may correspond to a time between sounding operations during which data may be transmitted), data may not be transmitted during the entirety of the elapsed time 320. Instead, the wireless communications device may also be required to transmit and/or receive one or more control signals associated with the sounding process (which may constitute sounding interval overhead). It follows, therefore that as a frequency of sounding operations (i.e., the shorter the sounding interval and elapsed time 320) increases, so does the sounding overhead over a given period of time. Time spent (e.g., by the transceiver and its associated circuitry) processing and communicating this sounding overhead is therefore time that is lost to potential data transmission—thus lowering the overall throughput associated with the communication. On the other hand, if the sounding interval is extended such that the elapsed time 320 increases, the communications device will receive less frequent channel condition information obtained during each sounding operation. In relatively poor radio conditions, this may lead to the communication channel becoming significantly degraded without the wireless communications device being aware of the degradation such that it may be addressed. Therefore, in an aspect of the present disclosure, the sounding interval managing component 304 (or the communications device 302, generally) may be configured to dynamically set the sounding interval such that the throughput of communications associated with communications device 302 approaches an optimal (or acceptable) level that maximizes the overall throughput of the communication channel over a particular time period while allowing the communications device 302 to be robust to potentially degraded channel conditions.

Thus, sounding interval managing component 304 may further include a sounding interval timing component 322, which may be configured to determine and set a sounding interval (e.g., current sounding interval 333) corresponding to a timing of one or more channel sounding operations. For purposes of the present disclosure, the term "current sounding interval" may correspond to a sounding interval that is presently being utilized by a wireless communications device. In other words, this "current sounding interval" may define a timing (e.g., a time interval between) between sounding operations and is associated with a frequency of these sounding operations. In some examples, sounding interval timing component 322 may be configured to set the sounding interval based on information obtained by information obtaining component 306 and according to one or more channel sounding management methods described herein. These channel sounding management methods may include, for example, the reactive and proactive sounding methods described herein, such as those described below in reference to at least FIGS. 4-8.

For instance, sounding interval timing component 322 may include a value comparing component 328, which may be configured to perform one or more aspects of a reactive sounding method described herein. For purposes of the present disclosure, the term "reactive sounding method" may refer to any method (such as, but not limited to method 500 of FIG. 5), which is configured to set a timing of one or more subsequent sounding processes based on a value of a current MCS index. As such, in an aspect, value comparing component 328 may be configured to compare a change in an MCS (e.g., its associated index value) against a predetermined MCS change threshold, and based on the comparison, a device or component therein (e.g., sounding interval timing component 322) may set a sounding interval for one or more sounding operations to a first duration value in response to a determination that the change in the MCS is greater than the predetermined MCS change threshold. Alternatively, based on the comparison, the device or the component therein (e.g., sounding interval timing component 322) may set a sounding interval for the one or more sounding operations to a second duration value, that is different than the first duration value, in response to a determination that the change in the MCS is less than the predetermined MCS change threshold.

In a particular example aspect, the value comparing component 328 may determine whether the MCS index drop value 312 (determined by information obtaining component 306) meets or exceeds a predetermined threshold MCS index drop value 330, which may be preconfigured or may be dynamically altered, for example, according to certain observed channel conditions. In an aspect, where it is determined that the MCS index drop value 312 meets or exceeds the predetermined threshold MCS index drop value 330, the sounding interval timing component 322 may set the sounding interval such that the communications device 302 performs, before transmitting one or more subsequent transmission bursts that are each scheduled to be transmitted after the current transmission burst, a sounding operation for one or more subsequent transmission bursts.

In an aspect, each of the one or more subsequent transmission bursts may constitute any transmission burst that is scheduled to be transmitted after a current transmission burst (or is transmitted after the current transmission burst regardless of whether it is explicitly scheduled for transmission). Also, in a non-limiting example, the predetermined threshold MCS index drop value 330 may be four, although any other example threshold MCS index drop value 330 may be used.

In addition, value comparing component 328 may be configured to compare current MCS index 308 to a threshold MCS index 332, which may also be preconfigured or dynamically altered, for example, according to certain observed channel conditions. For example, the value comparing component 328 may, in some instances, determine that the current MCS index 308 is less than the threshold MCS index 332. In an aspect, where it is determined that the current MCS index 308 is less than the threshold MCS index 332, the sounding interval timing component 322 may set the sounding interval such that the communications device 302 performs, before transmitting one or more subsequent transmission bursts that are each scheduled to be transmitted after the current transmission burst, a sounding operation for one or more subsequent transmission bursts. In a non-limiting example, the threshold MCS index 332 may be four, although any other example threshold MCS value may be used.

Moreover, sounding interval timing component 322 may include one or more components configured to perform aspects of one or more proactive sounding methods described by the present disclosure. For purposes of the present disclosure, the term "proactive sounding method" may refer to any method (such as, but not limited to method 700 of FIG. 7 and method 800 of FIG. 8), which is configured to set a timing of one or more subsequent sounding processes (i.e., a sounding interval) based on a value of a MCS index drop value 312 and/or a throughput degradation gradient 316.

For example, sounding interval timing component 322 may be configured to set a current sounding interval 333 (i.e., the timing of one or more subsequent sounding operations) to a particular value based on the determined MCS index drop value 312. In an aspect, for example, if the MCS index drop value 312 is 0 (or negative, which indicates an average increase in MCS index value), sounding interval timing component 322 may set the timing of the one or more subsequent sounding operations to perform one sounding operation every 40 ms. In a further example, the sounding interval timing component 322 may be configured to leave current sounding interval 333 unchanged in response to a determination that the MCS index drop value 312 is zero (or negative). Thus, if the MCS index drop value 312 is determined to be zero for a particular burst (or transmitted PDU of the burst), the current sounding interval 333 may remain at its present value. In some examples, the current sounding interval 333 may be extended (e.g., doubled) based upon a determination that the MCS index drop value 312 is zero.

Alternatively, if the MCS index drop value 312 is 1, sounding interval timing component 322 may set the timing of the one or more subsequent sounding operations to perform one sounding operation every 20 ms. In yet a further alternative, if the MCS index drop value 312 is 2, sounding interval timing component 322 may set the timing of the one or more subsequent sounding operations to perform one sounding operation per transmission burst. In another alternative, where the communications device 302 is an AP (e.g., AP 105 of FIG. 1), if the MCS index drop value 312 associated with a particular STA (e.g., a STA 115 of FIG. 1) is three or greater, sounding interval timing component 322 may mark this STA as "high Doppler" and may place the STA on blacklist for particular time period during which no burst transmissions are transmitted to the STA during the blacklist time period.

In a further aspect, the sounding interval timing component 322 may include an expected sounding interval determining component 334, which may be configured to perform one or more aspects of a proactive sounding method of the present disclosure (e.g., aspects of method 800 of FIG. 8, below). For example, expected sounding interval determining component 334 may be configured to determine an expected sounding interval 338 based on the determined throughput degradation gradient 316. For purposes of the present disclosure, the term "expected sounding interval" may refer to an estimation or forecast of a future sounding interval value that may be based on a number of factors, including but not limited to: one or more previous sounding interval values, prior signal performance or signal quality information (e.g., signal degradation or improvement based on metrics such as packet error rate, signal-to-noise ratio, or any other wireless signal or wireless communication channel quality metric known in the art), a rate of change associated with an signal quality information metric over a particular period of time, this particular period of time itself, or any other factor, property, or measurement value from which a future sounding interval can be predicted or forecast.

In an additional aspect, if the throughput degradation gradient 316 is greater than or equal to a first predetermined threshold degradation value (e.g., 30%/10 ms) of one or more predetermined threshold degradation values 340, the expected sounding interval determining component 334 may set the expected sounding interval 338 to one sounding operation per transmission burst. In another aspect, if the throughput degradation gradient 316 is greater than a second predetermined threshold degradation value (e.g., 30%/30 ms) of one or more predetermined threshold degradation values 340 but less than the first degradation gradient, the expected sounding interval determining component 334 may set the expected sounding interval 338 to one sounding operation per first set time period. In an example, the first set time period may be configurable or dynamic, and may have a value, for example, of about 30 ms.

Otherwise, if the throughput degradation gradient 316 is less than the second predetermined threshold degradation value, the expected sounding interval determining component 334 may set the expected sounding interval 338 to one sounding operation per extended expected sounding interval 342. In an aspect, this extended expected sounding interval 342 may have an extended set time period that may be longer than a time period of expected sounding interval 338 (or other expected sounding interval values that may be based on throughput degradation gradient 316 being greater than or equal to the second predetermined threshold degradation value). In an example, the extended expected sounding interval 342 (and extended set time period) may be configurable or dynamic, and may have a value, for example, of about 100 ms.

In an additional aspect, sounding interval timing component 322 may be configured to set current sounding interval 333 based on the value of the determined expected sounding interval 338. For instance, where the expected sounding interval 338 is less than or equal to the current sounding interval 333, the sounding interval timing component 322 may be configured to set the current sounding interval 333 to the expected sounding interval 338.

Alternatively, where the expected sounding interval 338 is greater than the current sounding interval 333, the sounding interval timing component 322 may determine whether a value of a sounding interval probing counter 343 has reached a threshold value (e.g., 5, 10, 20, 100, or any other value). In an aspect, the sounding interval probing counter 343 may correspond to a number of instances that the expected sounding interval 338 has been determined to be greater than the current sounding interval 333. Thus, upon a determination that the sounding interval probing counter 343 is less than the threshold value, the sounding interval timing component 322 may leave the current sounding interval 333 unchanged and may increment (i.e., add one to) the value of the sounding interval probing counter 343.

Alternatively, upon a determination that the sounding interval probing counter 343 is equal to the threshold value, the sounding interval timing component 322 may set the current sounding interval 333 to the expected sounding interval 338. Furthermore, in instances where it is determined that the expected sounding interval 338 is less than or equal to the current sounding interval 333, the sounding interval timing component 322 may reset the sounding interval probing counter 343 to zero.

Additionally, although components of communications device 302 have been described as performing reactive and/or proactive sounding, the sounding interval managing component 304 (and, generally, communications device 302) may be configured to perform reactive and proactive sounding methods cooperatively or consecutively. Furthermore, each of sounding interval managing component 304, information obtaining component 306, throughput component 314, sounding interval timing component 322, value comparing component 328, and expected sounding interval determining component 334 may be implemented by an application-specific integrated circuit (ASIC) and/or a processor (e.g., processor 346 or processor 904 of FIG. 9), which may execute instructions stored on a computer-readable medium/memory (e.g., computer-readable medium 348 or computer-readable medium 906 of FIG. 9) that may cause the processor to perform the functions associated with these components.

FIGS. 4-8 are described below and provide details regarding various methods, algorithms, or approaches that may be used to set a sounding interval for a communications device. According to some example methods, a reactive method for setting the sounding interval is presented, whereby the communications device determines whether transmission of burst data is to be halted after a current burst based on an MCS index value of the current burst (e.g., a most recently transmitted burst or a burst preparing to be transmitted). In other examples, a proactive sounding method is presented, whereby the communications device periodically determines whether the sounding interval for transmissions from the communications device is to be altered based on an MCS value drop value over a preceding transmission burst and/or a throughput degradation gradient corresponding to the transmission bursts that have been transmitted since a preceding sounding operation was performed.

Figure 4:
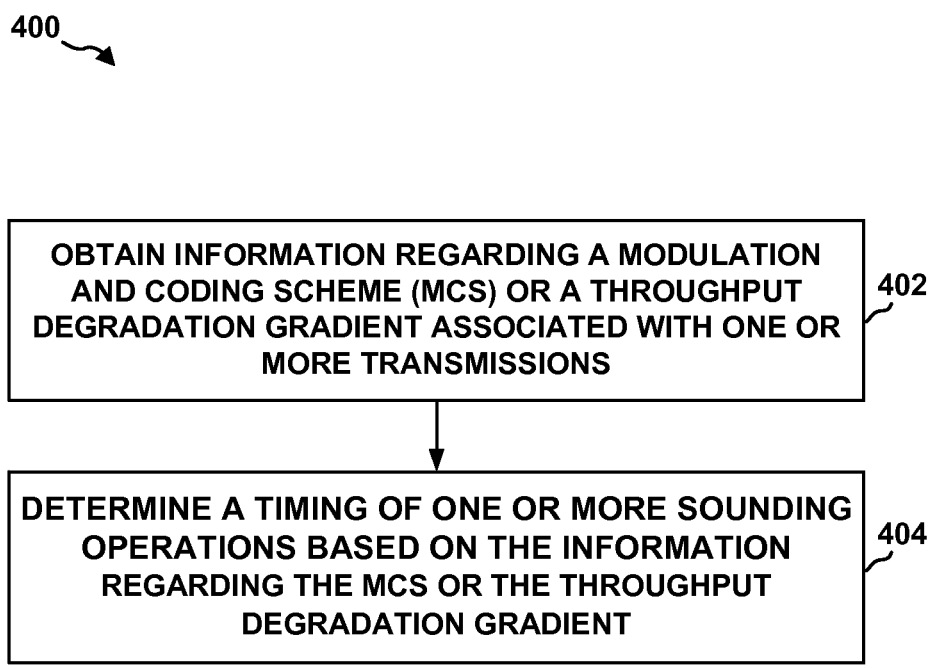
FIG. 4 is a flow chart illustrating an example of aspects of a method for setting a sounding interval for one or more transmissions of a communications device.

FIG. 4 shows a flow diagram illustrating an example method 400 for setting a sounding interval for one or more transmissions of a communications device. In an aspect, the example method 400 may comprise an example reactive sounding method or an example proactive sounding method according to the present disclosure.

Method 400 may include, at block 402, obtaining information associated with an MCS or a throughput degradation gradient of one or more transmission bursts. This information may include, but is not limited to, one or more MCS index values of the one or more transmission bursts, a throughput value associated with the channel during transmission of the bursts, a transmission time associated with the one or more transmission bursts, a change in an MCS associated with at least one of the one or more transmission bursts, or any other information associated with the one or more transmission bursts. In some examples, block 402 may be performed by information obtaining component 306 of FIG. 3. Specifically, the features of block 402 may be implemented by a processor (e.g., the processor 346 of FIG. 3 or processor 904 of FIG. 9) executing instructions stored on memory (e.g., memory 348 of FIG. 3 or memory 906 of FIG. 9) that cause the processor to perform the actions of block 402. In this implementation, the instructions are specifically programmed to perform the information obtaining functionality discussed herein, such as to determine the MCS index values, determine MCS index changes, determine throughput measurements, determine throughput changes, or determine any other information regarding the transmission bursts that is used for setting the timing of the sounding operations.

In addition, at block 404, method 400 may include determining a timing of one or more sounding operations based on the information associated with the MCS or the throughput degradation gradient obtained at block 402. The one or more sounding operations may be one or more subsequent sounding operations, and the timing of the one or more sounding operations may define a sounding interval. In an aspect, block 404 may be performed by sounding interval timing component 322 of FIG. 3. Specifically, the features of block 404 may be implemented by a processor (e.g., the processor 346 of FIG. 3 or processor 904 of FIG. 9) executing instructions stored on memory (e.g., memory 348 of FIG. 3 or memory 906 of FIG. 9) that cause the processor to perform the actions of block 404. In this implementation, the instructions are specifically programmed to perform the sounding operation timing functionality discussed herein, such as to determine the sounding operation timing based a MCS index value or change in MCS index value, determine the sounding operation timing based on throughput measurements or throughput changes, or determine the sounding operating timing based on any other information regarding the transmission bursts that is used for setting the timing of the sounding operations.

In addition, though not explicitly shown in FIG. 4, method 400 may include transmitting one or more transmissions (or transmission bursts) on one or more communication channels. In an aspect, method 400 may include transmitting information on at least one of the one or more communication channels to perform a sounding operation of the one or more sounding operations according to the determined timing. These additional optional aspects may be performed by transceiver 344 of FIG. 3. Additionally or alternatively, these features may be implemented by a processor (e.g., the processor 346 of FIG. 3 or processor 904 of FIG. 9) executing instructions stored on memory (e.g., memory 348 of FIG. 3 or memory 906 of FIG. 9) that cause the processor to perform these transmitting actions.

Further aspects of blocks 402 and 404 are presented below in reference to FIGS. 5-8.

Figure 5:
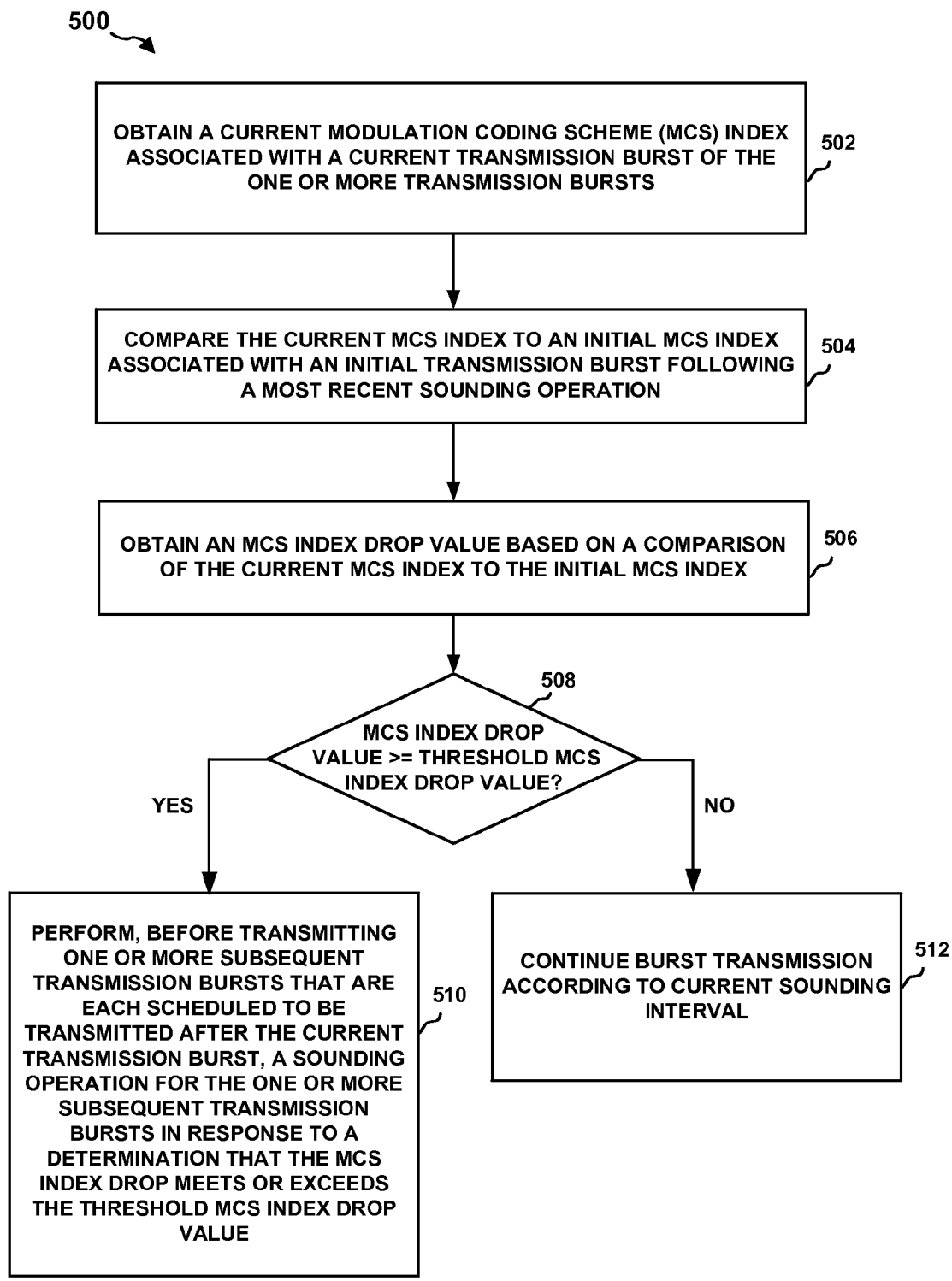
FIG. 5 is a flow chart illustrating an example of aspects of a reactive method for setting a sounding interval for one or more transmissions of a communications device.

FIG. 5 shows a flow diagram illustrating an example method 500 for setting a sounding interval for one or more transmissions of a communications device. In an aspect, the example method 500 may comprise an example reactive sounding method according to the present disclosure.

For instance, at block 502, method 500 may include obtaining a current MCS index associated with a current transmission burst of one or more transmission bursts. In addition, method 500 may include, at block 504, comparing the current MCS index to a base MCS index associated with an initial transmission burst following a most recent channel sounding operation. For instance, referring to FIG. 2, the current MCS index may correspond to the MCS index associated with initial burst 204.

In an additional aspect, method 500 may include, at block 506, obtaining an MCS index drop value based on a comparison of the current MCS index to the base MCS index. For instance, the MCS index drop value may be equal to the difference between the current MCS index and the base MCS index. Furthermore, method 500 may include, at block 508, determining whether the MCS index drop value meets or exceeds a predetermined threshold MCS index drop value. As such, block 508 may include determining that the MCS index drop value meets or exceeds a predetermined threshold MCS index drop value. Where such a determination is made, method 500 may proceed to block 510. In some examples, the threshold MCS index may be four, although any other threshold MCS index value may be utilized by method 500.

At block 510, method 500 may include performing, before transmitting one or more subsequent transmission bursts that are each scheduled to be transmitted after the current transmission burst, a sounding operation for the one or more subsequent transmission bursts in response to a determination that the MCS index drop value meets or exceeds the predetermined threshold MCS index drop value at block 508.

Where, however, a determination is made at block 510 that the MCS index drop value is less than a predetermined threshold MCS index drop value, method 500 may proceed to block 512, which includes continuing transmission of one or more subsequent transmission bursts according to a current sounding interval. In other words, at block 512, further burst transmission is performed without changes to the sounding interval.

In some examples, blocks 502 and 506 may be performed by information obtaining component 306 of FIG. 3; blocks 504 and 508 may be performed by value comparing component 328 of FIG. 3; and blocks 510 and 512 may be performed by transceiver 344 of FIG. 3. Specifically, the features of method 500 may be implemented by a processor (e.g., the processor 346 of FIG. 3) executing instructions stored on memory (e.g., memory 348 of FIG. 3) that are specifically programmed to cause the processor to perform the actions of method 500.

Moreover, the aspects of method 500 may be associated with, or may further define, one of blocks 402 or 404 of FIG. 4. For instance, blocks 502, 504, and 506 may be associated with block 402 of FIG. 4 and block 508, 510, and 512 may be associated with block 404 of FIG. 4.

Figure 6:
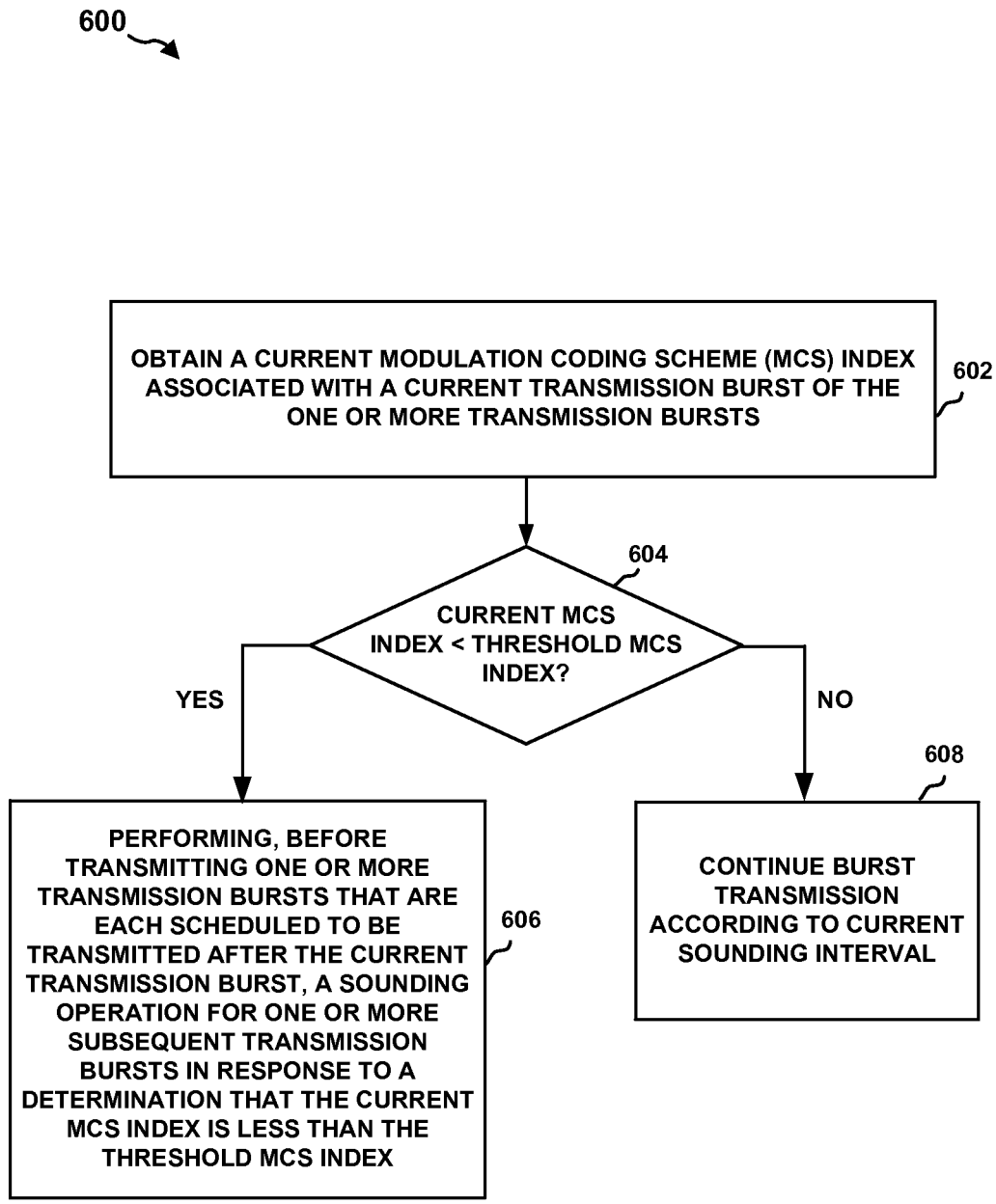
FIG. 6 is a flow chart illustrating an example of aspects of a reactive method for setting a sounding interval for one or more transmissions of a communications device.

FIG. 6 shows a flow diagram illustrating an example method 600 for setting a sounding interval for one or more transmissions of a communications device. In an aspect, the example method 600 may comprise an example reactive sounding method according to the present disclosure.

For instance, at block 602, method 600 may include obtaining a current MCS index associated with a current transmission burst of one or more transmission bursts.

In addition, method 600 may include, at block 604, determining whether the current MCS index is less than a threshold MCS index. For instance, referring to FIG. 2, the current MCS index may correspond to the MCS index associated with initial burst 204. Block 604 may include determining that the current MCS index is less than a threshold MCS index. Where such a determination is made, method 600 may proceed to block 606. In some examples, the threshold MCS index may be four, although any other threshold MCS index value may be utilized by method 600.

At block 606, method 600 may include performing, before transmitting one or more transmission bursts that are each scheduled to be transmitted after the current transmission burst, a sounding operation for one or more subsequent transmission bursts in response to a determination that the current MCS index is less than the threshold MCS index.

Where, however, a determination is made at block 606 that the current MCS index is greater than a threshold MCS index, method 600 may proceed to block 608, which includes continuing transmission of one or more subsequent bursts according to a current sounding interval. In other words, at block 608, further burst transmission is performed without changes to the sounding interval.

In some examples, block 602 may be performed by information obtaining component 306 of FIG. 3; block 604 may be performed by value comparing component 328 of FIG. 3; and blocks 606 and 608 may be performed by transceiver 344 of FIG. 3. Specifically, the features of method 600 may be implemented by a processor (e.g., the processor 346 of FIG. 3) executing instructions stored on memory (e.g., memory 348 of FIG. 3) that are specifically programmed to cause the processor to perform the actions of method 600.

Moreover, the aspects of method 600 may be associated with, or may further define, one of blocks 402 or 404 of FIG. 4. For instance, block 602 may be associated with block 402 of FIG. 4 and block 604, 606, and 608 may be associated with block 404 of FIG. 4.

Figure 7:
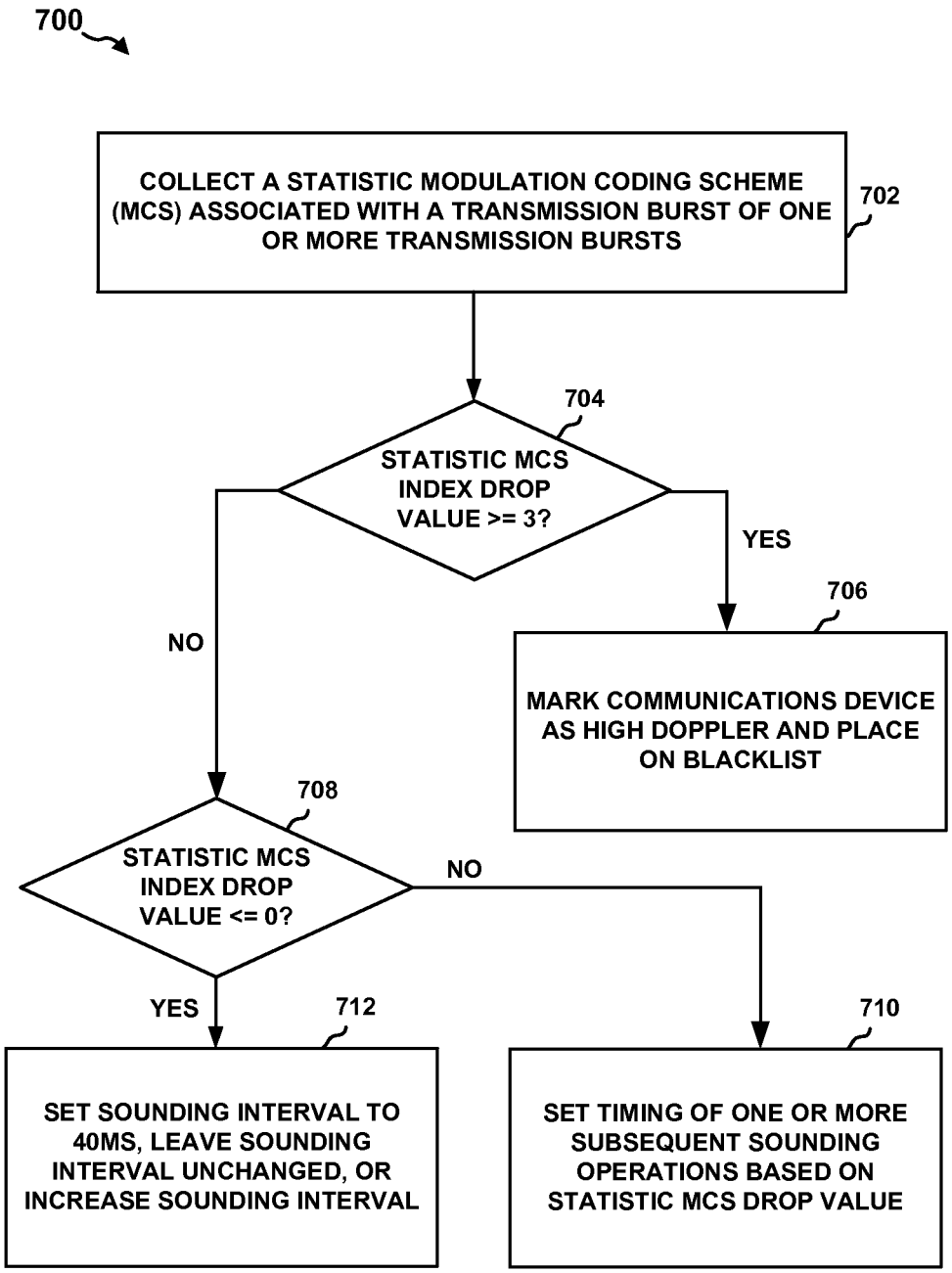
FIG. 7 is a flow chart illustrating an example of aspects of a proactive method for setting a sounding interval for one or more transmissions of a communications device.

FIG. 7 shows a flow diagram illustrating an example method 700 for setting a sounding interval for a communications device. In an aspect, the example method 700 may comprise an example proactive sounding method according to the present disclosure.

Method 700 may include, at block 702, obtaining a MCS index drop value, which may correspond to an MCS index drop occurring during a particular transmission burst (e.g., a last-occurring transmission burst). In other words, the MCS index drop value may correspond to a difference in an MCS index between an MCS index of a first PDU transmitted during a particular transmission burst and an MCS index of a last PDU transmitted during the transmission burst. Alternatively, the MCS index drop value may correspond to an average MCS index drop observed across successive PDUs in a transmission burst. In addition, though the MCS index drop value may correspond to an MCS index drop across a particular set of PDUs in a transmission burst, the MCS index drop value may alternatively correspond to a MCS value associated with a most recently transmitted PDU of a most recently transmitted burst. In other words, in the above example, the MCS index drop value may be zero. In some examples, block 702 may be performed by information obtaining component 306 of FIG. 3.

Furthermore, method 700 may include determining, at block 704, whether the MCS index drop value is greater than or equal to a predetermined threshold (e.g., three). Where it is determined that the MCS index drop value is greater than or equal to three, the method 700 may proceed to block 706, where the communications device to which the burst was transmitted may be marked as high Doppler and placed on a blacklist that indicates transmissions to this communications device will be at least temporarily halted.

Alternatively, where it is determined at block 704 that the MCS index drop value is less than the predetermined threshold (e.g., three), method 700 may proceed to block 708, where it is determined whether the MCS index drop value is less than or equal to zero. Where it is determined that the MCS index drop value is not less than or equal to zero, but less than 3 (i.e., if the MCS index drop value is equal to 1 or 2, method 700 may proceed to block 710. At block 710, method 700 may include setting the timing of one or more sounding interval (i.e., the timing of one or more subsequent sounding operations) to a particular value based on the MCS index drop value. In an aspect, at block 710, if the MCS index drop value is 1, block 710 may include setting the timing of the one or more subsequent sounding operations to perform one sounding operation every 20 ms (or another configured or determined value). In yet a further alternative, if the MCS index drop value is 2, block 710 may include setting the timing of the one or more subsequent sounding operations to perform one sounding operation per transmission burst (or another configured or determined time interval value).

Where it is determined at block 708 that the MCS index drop value is 0 (or negative, which indicates an average increase in MCS index value), method 700 may proceed to block 712, where one or more aspects may be performed (e.g., by sounding interval timing component 322 of FIG. 3). For instance, block 712 may include setting the timing of the one or more subsequent sounding operations to perform one sounding operation every 40 ms (or another configured or determined time interval value). In a further example, block 712 may include leaving a current sounding interval unchanged in response to a determination that the MCS index drop value is zero (or negative). Thus, in one alternative aspect, if the MCS index drop value is determined to be zero for a particular burst (or transmitted PDU of the burst), the current sounding interval may remain at its present value. In some alternative examples, at block 712, the current sounding interval may be extended from its current value (e.g., doubled) based upon a determination that the MCS index drop value is zero.

In some examples, block 702 may be performed by information obtaining component 306 of FIG. 3; blocks 704 and 708 may be performed by value comparing component 328 of FIG. 3; and blocks 706, 710, and 712 may be performed by sounding interval timing component 322 of FIG. 3. Specifically, the features of method 700 may be implemented by a processor (e.g., the processor 346 of FIG. 3) executing instructions stored on memory (e.g., memory 348 of FIG. 3) that are specifically programmed to cause the processor to perform the actions of method 700.

Moreover, the aspects of method 700 may be associated with, or may further define, one of blocks 402 or 404 of FIG. 4. For instance, blocks 702, 704, and 708 may be associated with block 402 of FIG. 4 and blocks 706, 710, and 712 may be associated with block 404 of FIG. 4.

Figure 8:
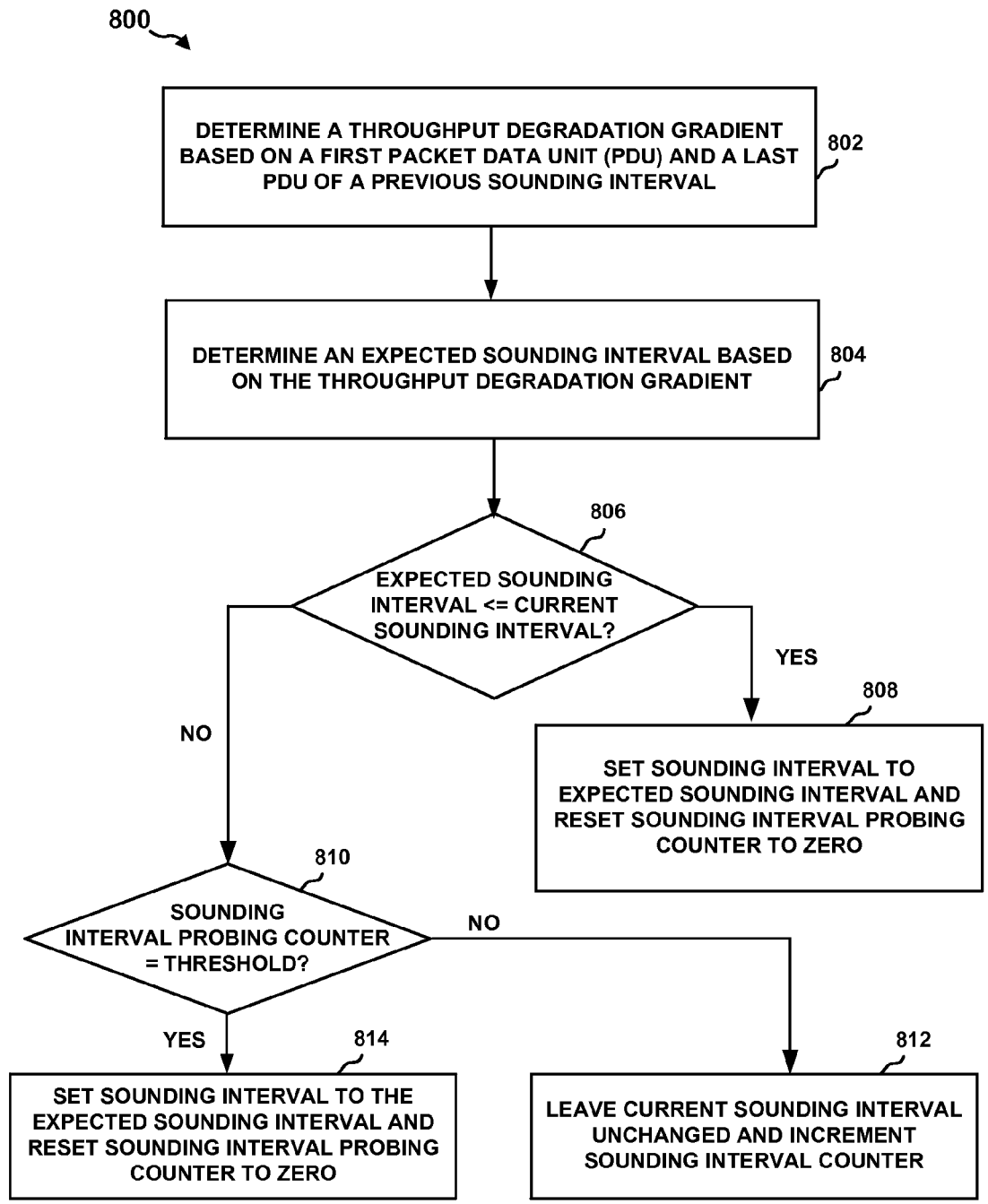
FIG. 8 is a flow chart illustrating an example of aspects of a proactive method for setting a sounding interval for one or more transmissions of a communications device.

FIG. 8 shows a flow diagram illustrating an example method 800 for setting a sounding interval for a communications device. In an aspect, the example method 800 may comprise an example proactive sounding method according to the present disclosure.

Method 800 may include, at block 802, determining a throughput degradation gradient associated with one or more transmission bursts (e.g., one or more previous bursts and/or a current transmission burst). In an aspect, block 812 may include determining the throughput degradation gradient by computing a ratio of a throughput change percentage to an elapsed time and setting the throughput degradation gradient to be equal to the ratio. In an aspect, the throughput change percentage may correspond to a percentage difference between a first throughput associated with a first PDU transmitted after a most recent sounding interval and a second throughput associated with the last PDU of the most recent sounding interval. Referring to FIG. 2, in some examples, this first PDU may correspond to a first PDU of initial burst 204 and the last PDU may correspond to the last PDU contained in current burst 206 (or, in some instances, a last PDU of a burst preceding current burst 206).

In addition, the elapsed time may correspond to a time period between transmission of the first PDU transmitted after a most recent sounding interval and transmission of the last PDU of the most recent sounding interval. Referring to FIG. 2, in some examples, this elapsed time may correspond to a difference in time between transmission of a first PDU of initial burst 204 and transmission of the last PDU contained in current burst 206 (or, in some instance, that of the last PDU of a burst preceding current burst 206).

In addition, method 800 may include, at block 804, determining an expected sounding interval based on the determined throughput degradation gradient from block 802. In an aspect, if the throughput degradation gradient is greater than or equal to a first predetermined threshold degradation value (e.g., 30%/10 ms), the expected sounding interval may be set to one sounding operation per transmission burst. In another aspect, if the throughput degradation gradient is greater than a second predetermined threshold degradation value (e.g., 30%/30 ms) but less than the first degradation gradient, the expected sounding interval may be set to one sounding operation per first set time period. In an example, the first set time period may be configurable or dynamic, and may have a value, for example, of about 30 ms. Otherwise, if the throughput degradation gradient is less than the second predetermined threshold degradation value, the expected sounding interval may be set to one sounding operation per extended expected sounding interval having an extended set time period. In an example, the extended expected sounding interval (and extended set time period) may be configurable or dynamic, and may have a value, for example, of about 100 ms.

In addition, method 800 may include, at block 806, determining whether the expected sounding interval is less than or equal to a current sounding interval. Where the expected sounding interval is less than or equal to the current sounding interval, method 800 may proceed to block 808, and may set the current sounding interval to the expected sounding interval. Furthermore, at block 808, a sounding interval probing counter may be reset to zero. In an aspect, the sounding interval probing counter may correspond to a number of instances that the expected sounding interval has been determined to be greater than or equal to the current sounding interval.

Alternatively, where it is determined at block 806 that the expected sounding interval is greater than the current sounding interval, method 800 may proceed to block 810, which may include determining whether a value of a sounding interval probing counter has reached a threshold value (e.g., 5, 10, 20, 100, or any other value). Upon a determination at block 810 that the sounding interval probing counter is not equal to (i.e., less than) the threshold value, method 800 may proceed to block 812, which may include leaving the current sounding interval unchanged and incrementing (i.e., adding one to) the value of the sounding interval probing counter. Alternatively, upon a determination that the sounding interval probing counter is equal to the threshold value, method 800 may proceed to block 814, which may include setting the current sounding interval to the expected sounding interval. Furthermore, block 814 may include resetting the sounding interval probing counter to zero.

In some examples, block 802 may be performed by throughput component 314 of FIG. 3; block 804 may be performed by expected sounding interval determining component 334 of FIG. 3; blocks 806 and 810 may be performed by value comparing component 328 of FIG. 3; and blocks 808, 812, and 814 may be performed by sounding interval timing component 322 of FIG. 3. Specifically, the features of method 800 may be implemented by a processor (e.g., the processor 346 of FIG. 3) executing instructions stored on memory (e.g., memory 348 of FIG. 3) that are specifically programmed to cause the processor to perform the actions of method 800.

Moreover, the aspects of method 800 may be associated with, or may further define, one of blocks 402 or 404 of FIG. 4. For instance, block 802 may be associated with block 402 of FIG. 4 and blocks 804, 806, 808, 810, 812, and 814 may be associated with block 404 of FIG. 4.

Figure 9:
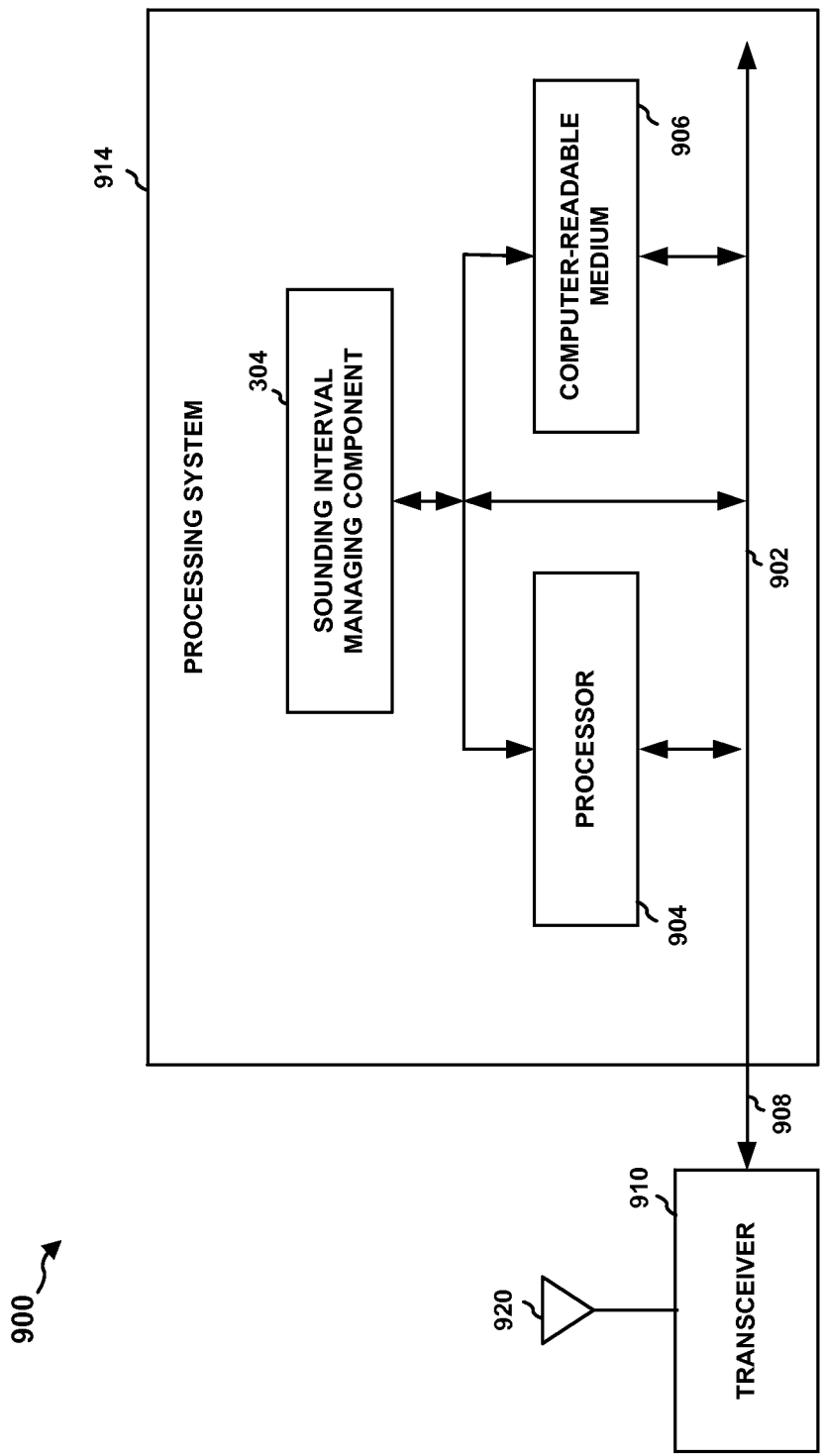
FIG. 9 is a block diagram illustrating an example of a processing system for sounding interval management.

FIG. 9 shows a block diagram 900 illustrating an example of a processing system 914 configured for performing various techniques described in this disclosure for managing a sounding interval of one or more communications devices. The processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors and/or hardware modules, represented by a processor 904, a sounding interval managing component 304 (e.g., as described in FIG. 3) and a computer-readable medium/memory 906. In an aspect, the processor 904 may correspond to processor 346 of FIG. 3, the computer-readable medium 906 may correspond to the computer-readable medium 348 of FIG. 3, and the processing system 914 may correspond to communications device 302 of FIG. 3. The bus 902 may also link various other circuits such as timing sources, peripherals, voltage regulators, and power management circuits, which are well known in the art, and therefore, will not be described any further.

The processing system 914 may be coupled to a transceiver 910 via an interface 908. The transceiver 910 is coupled to one or more antennas 920. The transceiver 910 may provide a means for communicating with various other apparatus or devices over a transmission medium. The transceiver 910 may receive a signal from the one or more antennas 920, may extract information from the received signal, and may provide the extracted information to the processing system 914, specifically the processor 904 and/or the sounding interval managing component 304. In addition, the transceiver 910 may receive information from the processing system 914 and/or the sounding interval managing component 304, and based on the received information, may generate a signal to be applied to the one or more antennas 920. The processing system 914 includes the processor 904 coupled to the computer-readable medium/memory 906, and/or to the sounding interval managing component 304, which may be an example of the sounding interval managing component 304 of FIG. 3.

The processor 904 is responsible for executing software stored on the computer-readable medium/memory 906. The software, when executed by the processor 904, causes the processing system 914 to perform the various functions described in the disclosure for setting a sounding interval for a communications device. The computer-readable medium/memory 906 may also be used for storing data that is manipulated by the processor 904 when executing software. The sounding interval managing component 304 may be software module running in the processor 904, resident/stored in the computer readable medium/memory 906, a hardware module coupled to the processor 904, or some combination thereof. In some instances, the processor 904 and the computer readable medium/memory 906 may be used to perform functions, operations, or features described herein with respect to one or more of the components of a communications device 302 (e.g., components of an AP or STA of FIG. 1).

The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

In a non-limiting aspect, the present disclosure contemplates various means for performing one or more functions for channel sounding management. For instance, the information obtaining component 306, processors 346 and/or 904, computer-readable media 348 and/or 906 may constitute non-limiting example means for obtaining information associated with a MCS or a throughput degradation gradient of one or more transmissions. Additionally, the sounding interval timing component 322, processors 346 and/or 904, computer-readable media 348 and/or 906 may constitute non-limiting example means for determining a timing of one or more sounding operations based on the information associated with the MCS or the throughput degradation gradient. Furthermore, the information obtaining component 306, processors 346 and/or 904, computer-readable media 348 and/or 906 may constitute non-limiting example means for obtaining a current MCS index associated with a current transmission burst of the one or more transmission bursts. In addition, the sounding interval timing component 322, processors 346 and/or 904, computer-readable media 348 and/or 906 may constitute non-limiting example means for setting a sounding interval based on the current MCS index. Value comparing component 328, processors 346 and/or 904, computer-readable media 348 and/or 906 may constitute non-limiting example means for comparing the current MCS index to a base MCS index. Additionally, information obtaining component 306, processors 346 and/or 904, computer-readable media 348 and/or 906 may constitute non-limiting example means for obtaining an MCS index drop value based on a comparison of the current MCS index to the base MCS index. Value comparing component 328, processors 346 and/or 904, computer-readable media 348 and/or 906 may constitute non-limiting example means for determining that the MCS index drop value meets or exceeds a predetermined threshold MCS index drop value. In addition, transceiver 344 and/or 910, processors 346 and/or 904, computer-readable media 348 and/or 906 may constitute non-limiting example means for performing, before transmitting one or more subsequent transmission bursts that are each scheduled to be transmitted after the current transmission burst, a sounding operation for the one or more subsequent transmission bursts. Furthermore, information obtaining component 306, processors 346 and/or 904, computer-readable media 348 and/or 906 may constitute non-limiting example means for collecting a MCS index drop value associated with a transmission burst of the one or more transmission bursts. Additionally, sounding interval timing component 322, processors 346 and/or 904, computer-readable media 348 and/or 906 may constitute non-limiting example means for setting a sounding interval based on the MCS index drop value. Information obtaining component 306, processors 346 and/or 904, computer-readable media 348 and/or 906 may constitute non-limiting example means for determining a throughput degradation gradient based on a first PDU and a last PDU of a previous sounding interval. Additionally, expected sounding interval determining component 334, processors 346 and/or 904, computer-readable media 348 and/or 906 may constitute non-limiting example means for determining an expected sounding interval based on the throughput degradation gradient. Furthermore, value comparing component 328, processors 346 and/or 904, computer-readable media 348 and/or 906 may constitute non-limiting example means for comparing the expected sounding interval to a current sounding interval;

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. An apparatus for channel sounding management, comprising:
   a processor; and
   a memory communicatively coupled with the processor, the memory storing instructions, that when executed by the processor, cause the processor to:
      obtain information regarding a change in a modulation and coding scheme (MCS) associated with one or more transmissions;

determine a timing of one or more sounding operations based on the information regarding the change in the MCS; and perform a sounding operation of the one or more sounding operations according to the determined timing.

2. The apparatus of claim 1, further comprising:

a transmitter communicatively coupled with the processor and the memory, wherein the instructions comprise further instructions configured to cause the processor to:

transmit, via the transmitter, the one or more transmissions on one or more communication channels; and transmit, via the transmitter, information on at least one of the one or more communication channels to perform the sounding operation of the one or more sounding operations according to the determined timing.

3. The apparatus of claim 1, wherein the instructions that cause the processor to determine the timing of the one or more sounding operations comprise instructions configured to cause the processor to:

compare the change in the MCS against a predetermined MCS change threshold;

set a sounding interval for the one or more sounding operations to a first duration value in response to a determination that the change in the MCS is greater than the predetermined MCS change threshold; and set a sounding interval for the one or more sounding operations to a second duration value, that is different than the first duration value, in response to a determination that the change in the MCS is less than the predetermined MCS change threshold.

4. An apparatus for channel sounding management, comprising:

a processor; and a memory communicatively coupled with the processor, the memory storing instructions, that when executed by the processor, cause the processor to:

obtain information regarding a modulation and coding scheme (MCS) or a throughput degradation gradient associated with one or more transmissions;

determine a timing of one or more sounding operations based on the information regarding the MCS or the throughput degradation gradient; and perform a sounding operation of the one or more sounding operations according to the determined timing;

wherein the one or more transmissions comprise one or more transmission bursts;

wherein the instructions that cause the processor to obtain the information comprise instructions configured to cause the processor to obtain a current MCS index associated with a current transmission burst of the one or more transmission bursts; and wherein the instructions that cause the processor to determine the timing of the one or more sounding operations comprise instructions configured to cause the processor to set a sounding interval for the one or more sounding operations based on the current MCS index.

5. The apparatus of claim 4, wherein the instructions that cause the processor to obtain the information comprise instructions configured to cause the processor to compare the current MCS index to a base MCS index, and instructions configured to cause the processor to obtain an MCS index drop value based on a comparison of the current MCS index to the base MCS index; and wherein the instructions that cause the processor to determine the timing of the one or more sounding operations comprise instructions configured to cause the processor to:

determine that the MCS index drop value meets or exceeds a predetermined threshold MCS index drop value; and perform, before transmitting one or more subsequent transmission bursts that are scheduled to be transmitted after the current transmission burst, the sounding operation for the one or more subsequent transmission bursts in response to a determination that the MCS index drop value meets or exceeds the predetermined threshold MCS index drop value.

6. The apparatus of claim 4, wherein the instructions that cause the processor to determine the timing of the one or more sounding operations comprise instructions configured to cause the processor to:

determine that the current MCS index is less than a predetermined threshold MCS index; and perform, before transmitting one or more subsequent transmission bursts that are scheduled to be transmitted after the current transmission burst, the sounding operation for one or more subsequent transmission bursts in response to a determination that the current MCS index is less than the predetermined threshold MCS index.

7. The apparatus of claim 1, wherein the one or more transmissions comprise one or more transmission bursts;

wherein the instructions that cause the processor to obtain the information comprise instructions configured to cause the processor to collect an MCS index drop value associated with a transmission burst of the one or more transmission bursts; and wherein the instructions that cause the processor to determine the timing of the one or more sounding operations comprise instructions configured to cause the processor to set a sounding interval for the one or more sounding operations based on the MCS index drop value.

8. The apparatus of claim 7, wherein the MCS index drop value comprises an average MCS index drop value based on an average of multiple MCS index drops occurring during a plurality of protocol data units (PDUs) of the transmission burst.

9. An apparatus for channel sounding management, comprising:

a processor; and a memory communicatively coupled with the processor, the memory storing instructions, that when executed by the processor, cause the processor to:

obtain information regarding a modulation and coding scheme (MCS) or a throughput degradation gradient associated with one or more transmissions;

determine a timing of one or more sounding operations based on the information regarding the MCS or the throughput degradation gradient; and perform a sounding operation of the one or more sounding operations according to the determined timing;

wherein the instructions that cause the processor to obtain the information comprise instructions configured to cause the processor to determine the throughput degradation gradient based on a first packet data unit (PDU) and a last PDU of a previous sounding interval; and wherein the instructions that cause the processor to determine the timing of the one or more sounding operations comprise instructions configured to cause the processor to:
  determine an expected sounding interval based on the throughput degradation gradient;
  compare the expected sounding interval to a current sounding interval; and
  set the timing of the one or more sounding operations based on the comparison.

10. The apparatus of claim 9, wherein the instructions that cause the processor to set the timing of the one or more sounding operations comprise instructions configured to cause the processor to:
  determine that the expected sounding interval is less than the current sounding interval based on the comparison; and
  set the current sounding interval to the expected sounding interval in response to a determination that the expected sounding interval is less than the current sounding interval.

11. The apparatus of claim 10, wherein the instructions that cause the processor to set the timing of the one or more sounding operations comprise instructions configured to cause the processor to reset a sounding interval probing counter in response to the determination that the expected sounding interval is less than the current sounding interval.

12. The apparatus of claim 9, wherein the instructions that cause the processor to set the timing of the one or more sounding operations comprise instructions configured to cause the processor to:
  determine that the expected sounding interval is greater than the current sounding interval based on the comparison;
  determine that a sounding interval probing counter is less than a predetermined threshold counter value; and
  increment the sounding interval probing counter in response to a determination that the expected sounding interval is greater than the current sounding interval and a determination that the sounding interval probing counter is less than the predetermined threshold counter value.

13. The apparatus of claim 9, wherein the instructions that cause the processor to set the timing of the one or more sounding operations comprise instructions configured to cause the processor to:
  determine that the expected sounding interval is greater than the current sounding interval based on the comparison;
  determine that a sounding interval probing counter is equal to a predetermined threshold counter value; and
  set the current sounding interval to the expected sounding interval in response to a determination that the expected sounding interval is greater than the current sounding interval and a determination that the sounding interval probing counter is equal to the predetermined threshold counter value.

14. The apparatus of claim 9, wherein the instructions that cause the processor to determine the throughput degradation gradient comprise instructions configured to cause the processor to compute a ratio of (1) a throughput change percentage between a first throughput associated with the first PDU and a second throughput associated with the last PDU to (2) an elapsed time between transmission of the first PDU and transmission of the last PDU.

15. The apparatus of claim 9, wherein the instructions that cause the processor to determine the expected sounding interval comprise instructions configured to cause the processor to:
  determine that the throughput degradation gradient is less than a predetermined threshold degradation value; and
  set the expected sounding interval to an extended expected sounding interval value in response to a determination that the throughput degradation gradient is less than the predetermined threshold degradation value.

16. An apparatus for channel sounding management, comprising:
  means for obtaining information regarding a modulation and coding scheme (MCS) associated with one or more transmissions;
  means for determining a timing of one or more sounding operations based on the information regarding the change in the MCS; and
  means for performing a sounding operation of the one or more sounding operations according to the determined timing.

17. The apparatus of claim 16, wherein the one or more transmissions comprise one or more transmission bursts;
  wherein the means for obtaining the information comprises means for obtaining a current MCS index associated with a current transmission burst of the one or more transmission bursts; and
  wherein the means for determining the timing of the one or more sounding operations comprises means for setting a sounding interval for the one or more sounding operations based on the current MCS index.

18. The apparatus of claim 17, wherein the means for obtaining the information comprises means for comparing the current MCS index to a base MCS index, and means for obtaining an MCS index drop value based on a comparison of the current MCS index to the base MCS index; and
  wherein the means for determining the timing of the one or more sounding operations comprises:
    means for determining that the MCS index drop value meets or exceeds a predetermined threshold MCS index drop value; and
    means for performing, before transmitting one or more subsequent transmission bursts that are each scheduled to be transmitted after the current transmission burst, the sounding operation for the one or more subsequent transmission bursts in response to a determination that the MCS index drop value meets or exceeds the predetermined threshold MCS index drop value.

19. The apparatus of claim 16, wherein the one or more transmissions comprise one or more transmission bursts;
  wherein the means for obtaining the information comprises means for collecting a MCS index drop value associated with a transmission burst of the one or more transmission bursts; and
  wherein the means for determining the timing of the one or more sounding operations comprises means for setting a sounding interval for the one or more sounding operations based on the MCS index drop value.

20. The apparatus of claim 16, wherein the means for obtaining the information comprises means for determining a throughput degradation gradient based on a first packet data unit (PDU) and a last PDU of a previous sounding interval; and
  wherein the means for determining the timing of the one or more sounding operations comprises:

means for determining an expected sounding interval based on the throughput degradation gradient;
means for comparing the expected sounding interval to a current sounding interval; and
means for setting the timing of the one or more sounding operations based on the comparison.

21. A non-transitory computer-readable medium storing computer-executable instructions, the computer-executable instructions comprising:
code for obtaining information regarding a change in a modulation and coding scheme (MCS) associated with one or more transmissions;
code for determining a timing of one or more sounding operations based on the information regarding the change in the MCS; and
code for performing a sounding operation of the one or more sounding operations according to the determined timing.

22. The non-transitory computer-readable medium of claim 21, wherein the one or more transmissions comprise one or more transmission bursts;
wherein the code for obtaining the information comprises code for obtaining a current MCS index associated with a current transmission burst of the one or more transmission bursts; and
wherein the code for determining the timing of the one or more sounding operations comprises code for setting a sounding interval for the one or more sounding operations based on the current MCS index.

23. The non-transitory computer-readable medium of claim 22, wherein the code for obtaining the information comprises:
code for comparing the current MCS index to a base MCS index; and
code for obtaining an MCS index drop value based on a comparison of the current MCS index to the base MCS index; and
wherein the code for determining the timing of the one or more sounding operations comprises:
code for determining that the MCS index drop value meets or exceeds a predetermined threshold MCS index drop value; and
code for performing, before transmitting one or more subsequent transmission bursts that are each scheduled to be transmitted after the current transmission burst, the sounding operation for the one or more subsequent transmission bursts in response to a determination that the MCS index drop value meets or exceeds the predetermined threshold MCS index drop value.

24. The non-transitory computer-readable medium of claim 21, wherein the one or more transmissions comprise one or more transmission bursts;
wherein the code for obtaining the information comprises code for collecting a MCS index drop value associated with a transmission burst of the one or more transmission bursts; and
wherein the code for determining the timing of the one or more sounding operations comprises code for setting a sounding interval for the one or more sounding operations based on the MCS index drop value.

25. The non-transitory computer-readable medium of claim 21, wherein the code for obtaining the information comprises code for determining the throughput degradation gradient based on a first packet data unit (PDU) and a last PDU of a previous sounding interval; and
wherein the code for determining the timing of the one or more sounding operations comprises:

code for determining an expected sounding interval based on the throughput degradation gradient;
code for comparing the expected sounding interval to a current sounding interval; and
code for setting the timing of the one or more sounding operations based on the comparison.

26. A method for channel sounding management, comprising:
obtaining information regarding a change in a modulation and coding scheme (MCS) associated with one or more transmissions;
determining a timing of one or more sounding operations based on the information regarding the change in the MCS; and
performing a sounding operation of the one or more sounding operations according to the determined timing.

27. The method of claim 26, wherein the one or more transmissions comprise one or more transmission bursts;
wherein obtaining the information further comprises:
obtaining a current MCS index associated with a current transmission burst of the one or more transmission bursts;
comparing the current MCS index to a base MCS index associated with an initial transmission burst following a most recent sounding operation; and
obtaining an MCS index drop value based on a comparison of the current MCS index to the base MCS index; and
wherein determining the timing of the one or more sounding operations comprises:
setting a sounding interval for the one or more sounding operations based on the current MCS index; and
determining that the MCS index drop value meets or exceeds a predetermined threshold MCS index drop value; and
further comprising performing, before transmitting one or more subsequent transmission bursts that are each scheduled to be transmitted after the current transmission burst, the sounding operation for the one or more subsequent transmission bursts in response to a determination that the MCS index drop value meets or exceeds the predetermined threshold MCS index drop value.

28. The method of claim 26, wherein obtaining the information further comprises determining the throughput degradation gradient based on a first packet data unit (PDU) and a last PDU of a previous sounding interval; and
wherein determining the timing of the one or more sounding operations comprises:
determining an expected sounding interval based on the throughput degradation gradient;
comparing the expected sounding interval to a current sounding interval; and
setting the timing of the one or more sounding operations based on the comparison.

29. The method of claim 26,
wherein determining the timing of the one or more sounding operations comprises:
comparing the change in the MCS against a predetermined MCS change threshold;
setting a sounding interval for the one or more sounding operations to a first duration value in response to a determination that the change in the MCS is greater than the predetermined MCS change threshold; and
setting a sounding interval for the one or more sounding operations to a second duration value, that is different than the first duration value, in response to a determination that the change in the MCS is less than the predetermined MCS change threshold.

30. The method of claim 26, further comprising:

transmitting the one or more transmissions on one or more communication channels; and transmitting information on at least one of the one or more communication channels to perform the sounding operation of the one or more sounding operations according to the determined timing.

* * * * *